United States Patent Office 3,088,805
Patented May 7, 1963

3,088,805
A METHOD FOR PRODUCING ZIRCONIUM DIBORIDE
Perry G. Cotter, Norris, and Ralph A. Potter, Oak Ridge, Tenn., assignors to the United States of America as represented by the Secretary of the Interior
No Drawing. Filed Aug. 21, 1959, Ser. No. 835,376
4 Claims. (Cl. 23—204)
(Granted under Title 35, U.S. Code (1952), sec. 266)

The invention herein described and claimed may be manufactured and used by or for the Government of the United States of America for governmental purposes without the payment of royalties therein or therefor.

This invention relates to a self-bonding zirconium boride abrasive material, a method for preparing the material, and the preparation of abrasive articles therefrom.

It is the primary object of this invention to produce a zirconium boride abrasive material having superior abrasive, bonding and refractory properties, which will be highly useful in the various arts.

It is a futher object of this invention to provide a self-bonding zirconium boride abrasive material and a method for making it.

A further object of this invention is to provide a self-bonding zirconium boride abrasive and refractory granule consisting of a central core of zirconium silicate having an outer coating of zirconium diboride, and a method of making said material.

A further object of this invention is to provide an abrasive and refractory article comprising an admixture of (1) zirconium silicate particles coated with zirconium boride with (2) other abrasive and refractory materials, and the method of preparing said abrasive article.

A further object of this invention is to prepare a zirconium boride abrasive and refractory particles by reacting zircon sand with boron carbide, carbon and boron oxide at elevated temperatures.

A further object of this invention is to prepare an abrasive and refractory shape by hot-pressing self-bonding zirconium boride particles under elevated temperatures and pressures.

A further object of this invention is to provide a new and improved method of preparing zirconium boride.

Further objects will become apparent on consideration of the specification and claims.

Borides of zirconium have been employed as abrasives and tool facings because of the excellent hardness and refractory properties they possess. The prior art methods of making these borides commonly involves starting with either powdered zirconium metal itself, or the oxides. This involves the preliminary separation of the metal, or the oxide from the naturally occurring ores, i.e., zircon, or baddeleyite, and then reacting with boron. Additionally, it is known to react zirconium hydride to produce borides, which also involves several intermediate steps.

We have found that a desirable zirconium boride abrasive material having self-bonding properties can be prepared from naturally occurring zircon (zirconium silicate), and thus avoid the separation steps required heretofore. Elimination of these intermediate steps results in a more economical product having, therefore, a more wide-spread field of use.

In brief, our invention consists in reacting a mixture of zirconium silicate (zircon) and boron carbide, and carbon (lampblack) in a carbon crucible under vacuum or an inert atmosphere until the desired stage of the reaction is reached. Some of the boron carbide may be replaced by boron oxide, although it is generally more desirable to employ boron carbide exclusively since this avoids the additional reaction of boron oxide with carbon to form boron carbide. The reaction product is then removed from the crucible, screened to remove any carbon present, and placed in a graphite die where it is subject to heat and pressure. This hot-pressing results in the formation of a self-bonded abrasive and refractory shape. Other abrasive and refractory materials may be added if desired, before the hot-pressing step.

Heretofore, the commonly employed methods of preparing zirconium borides resulted in a finely divided powdered product. In contrast the method of this invention produces tough, solid individual granules, which results in improved bonding, abrasive and refractory qualities.

Without being bound to any theory, it is believed that what occurs is that the zirconium silicate reacts with the boron carbide to form zirconium boride at the surface of the zircon granules according to the overall equation:

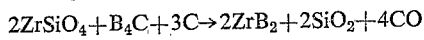
$$2ZrSiO_4 + B_4C + 3C \rightarrow 2ZrB_2 + 2SiO_2 + 4CO$$

The original shape of the granule is preserved, and the thickness of the coating in any given particle may be varied by changing the time and temperature conditions of the reaction. The hot-pressed self-bonding properties apparently are due to the formation of a zirconium-boronsilicate glassy phase, which acts as a cementing agent.

The ratios of ingredients employed may be stoichiometric or may be varied according to the extent it is desired to transform the silicate to the boride. A large excess of silicate would result in a product, other conditions being equal, having a greater percentage of silicate in the final product. In general, the greater the percentage of zirconium diboride present, the better the bond produced, so that too great a percentage of zirconium silicate is not usually desirable. The mol ratio of reactants may vary from about 1.4 to about 2.0 moles of zirconium silicate to 1 mol of boron carbide to about 3 to about 4 moles of carbon. If boron oxide is employed, the relative amount of carbon reagent employed must be increased to react with the oxide to form the carbide according to the equation—

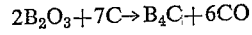
$$2B_2O_3 + 7C \rightarrow B_4C + 6CO$$

The reaction temperature may vary from about 1350° C. as the lowest practical temperature to about 1900° C., and the time of less than ½ hour to about 6 hours, the high temperatures requiring less time to effect the same degree of conversion. With a molecular excess of boron carbide present, reaction conditions may be so selected as to give a product having the amount of silicate desired in the final product.

The following examples are set forth to illustrate the method of preparing the zirconium boride composition. All parts are by weight.

*Example 1*

A mixture of 76 parts zircon and 13 parts boron carbide and 11 parts lampblack, were mixed and placed into a carbon crucible and heated in an inert atmosphere for one-half to three hours at a temperature of 1550–1700° C. After cooling, the reaction product was screened to remove free carbon.

A quantity of the reaction product was placed in a graphite die. Pressure was applied by a graphite plunger and the die was heated by high frequency induction. The conditions employed were 700–1000 p.s.i. pressure at a temperature of 1000 to 1200° C. and a holding time of 15–20 minutes.

The resultant shape was a product having good abrasive qualities with a high heat resistance. On heating in air at 1000° C. for seven hours only a 2% gain in weight occurred, showing superior refractory properties.

Example 2

A mixture of 72.25 parts of zirconium silicate, 15.03 parts boron carbide and 12.72 parts carbon (lampblack) were reacted, under the conditions recited in Example 1, and the resulting product treated in a similar manner. Results similar to those of Example 1 were achieved.

Example 3

Instead of employing boron carbide, a mixture of boron carbide and boron oxide was employed in this example. A mixture of 66.2 parts of zirconium silicate, 3.5 parts boron carbide, 17.4 parts boron oxide and 12.9 parts lampblack were reacted under the conditions of Example 1. A zirconium boride product was obtained which bonded satisfactorily under heat and pressure in a graphite die to give a product having good abrasive properties.

The density of the particles produced vary from slightly more than 4.65 g./cc., the density of zircon, up to 6.09 g./cc., the density of zirconium diboride, depending on the extent of the reaction. Hardness of the material is within the range of Alundum, and slightly below zirconium carbide. Its abrasive value, therefore, is within this order of magnitude.

Other abrasive and/or refractory materials may be incorporated by admixing them with the zirconium boride products, prior to the hot-pressing step. Thus, a mixture containing 75% by weight of molybdenum disilicide particles, the remainder being the zirconium boride product described in the example, was hot-pressed in the manner and under the conditions of the example. The product showed a gain in weight of only 0.6% when heated in air at 1000° C. for four hours, showing excellent refractory qualities.

Employing an excess of boron carbide results in a composition of the zirconium diboride product together with boron carbide, which may then be hot-pressed to form an abrasive and refractory article. Shaped articles such as slabs, discs, and wheels, etc., may be produced by hot-pressing in suitably formed dies for use in the various arts as abrasives and refractories.

Under suitable hot-pressing conditions in the lower pressure and temperature ranges, a porous hot-pressed material suitable for filtration purposes may be obtained. Because of the relative inertness of the product it may be employed to filter corrosive materials.

It is understood that the details of procedure may be varied without departing from the true spirit of the invention, as depicted in the appended claims.

We claim:

1. A method for making a self-bonding zirconium diboride abrasive and refractory material which comprises; reacting a mixture comprising zircon particles, boron carbide, and carbon at an elevated temperature in the range of from about 1350° C. to about 1900° C.

2. A method for making a self-bonding zirconium diboride abrasive and refractory material which comprises; reacting a mixture of zircon particles, boron carbide, boron oxide and carbon at an elevated temperature in the range of about 1350° C. to about 1900° C.

3. The method for making a self-bonding zirconium diboride abrasive and refractory material which comprises, reacting a mixture comprising zircon particles, boron carbide and carbon at a temperature in the range of 1550 to 1700° C. for from about ½ hour to about 3 hours.

4. A method for preparing zirconium diboride which comprises reacting a mixture of zirconium silicate, boron carbide and carbon in a ratio of about 1.4 to 2 moles of zirconium silicate: about 1 mole of boron carbide: about 3 to 4 moles of carbon, at an elevated temperature of about 1350° C. to about 1900° C. for a time sufficient to complete the reaction.

References Cited in the file of this patent

UNITED STATES PATENTS

| | | |
|---|---|---|
| 1,261,948 | Loveman | Apr. 9, 1918 |
| 1,527,470 | Cooper | Feb. 24, 1925 |
| 1,858,413 | Noack et al. | May 17, 1932 |
| 2,541,658 | Masin et al. | Feb. 13, 1951 |
| 2,877,105 | Smith | Mar. 10, 1959 |
| 2,906,605 | Dubeck | Sept. 29, 1959 |
| 2,957,754 | Nicholson | Oct. 25, 1960 |

FOREIGN PATENTS

| | | |
|---|---|---|
| 223,572 | Great Britain | June 11, 1925 |